Sept. 15, 1942.  C. WYSS  2,295,821
VALVE AND PIPE CONNECTION
Filed Nov. 12, 1940  2 Sheets-Sheet 2

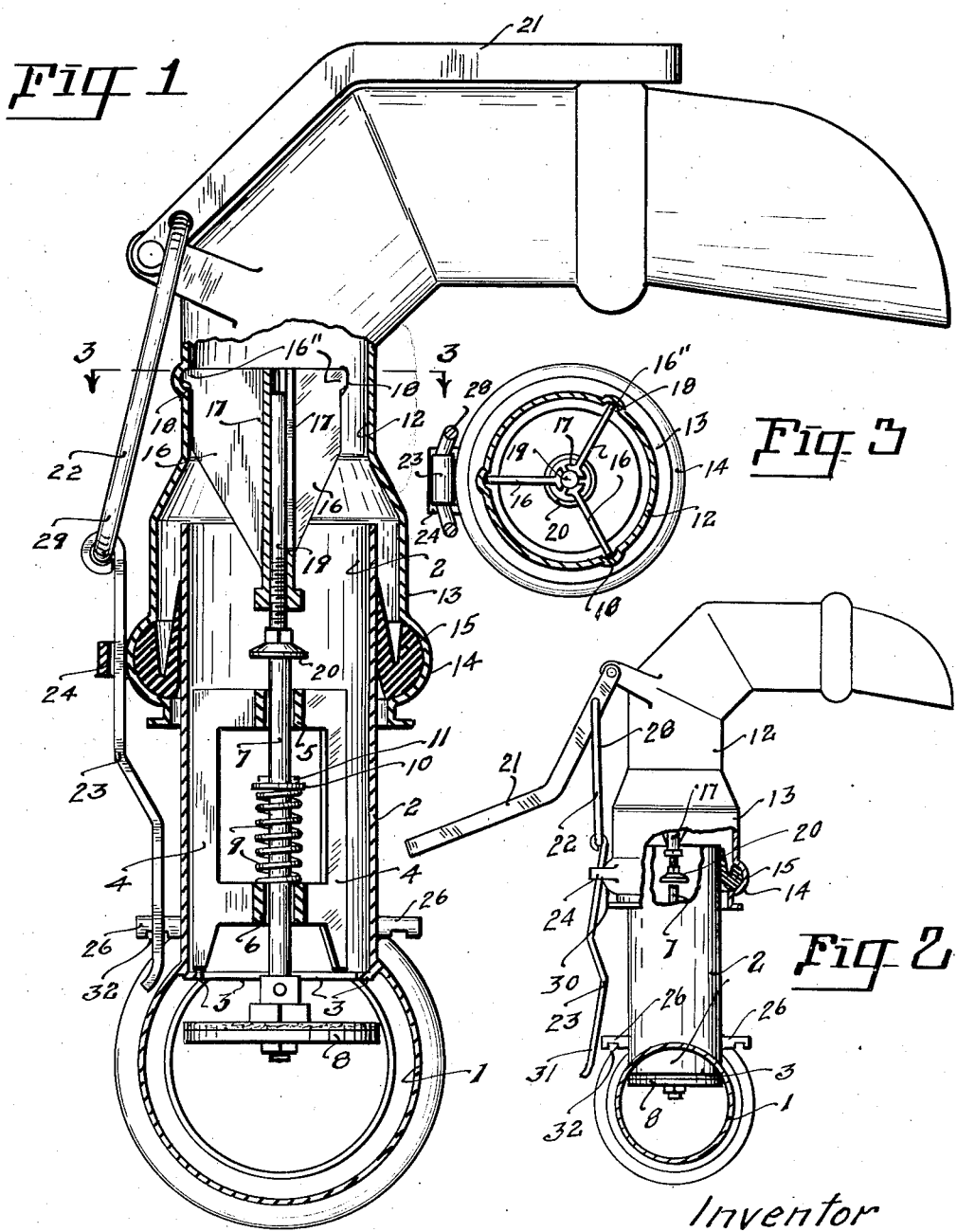

Inventor
Chris Wyss
Attorney
Clive Hartson

Patented Sept. 15, 1942

2,295,821

UNITED STATES PATENT OFFICE 2,295,821

VALVE AND PIPE CONNECTION

Chris Wyss, Tillamook, Oreg.

Application November 12, 1940, Serial No. 365,178

1 Claim. (Cl. 284—17)

My invention relates to a pipe connection wherein one of the connecting members is provided with a normally closed valve and the other is provided with means for opening the valve and for maintaining the valve in open position during the period such members are connected to one another.

An object of the invention resides in the valve construction and the means employed for mounting it within one of the connecting members.

A further object of the invention is the provision of a lever system for completing and holding the pipe connection together, when this connection is made the pressure of the fluid contained in the pipe behind the valve must be overcome and held by a special lever mechanism, permitting the fluid to pass through the valve.

Another object of the invention resides in the valve operating means mounted within the other connecting member, and the means incorporated therein for regulating the extent of valve opening.

These and other objects of the invention will appear more fully upon reading the description following, aided by the several views in the accompanying drawings, forming a part hereof, wherein Figure 1 is a vertical section of the connecting members connected to one another.

Figure 2 is a vertical elevation with portions broken away.

Figure 3 is the sectional view indicated by section line 3—3 in Figure 1.

In the drawings, similar characters refer to similar parts throughout the several views.

Figure 4:
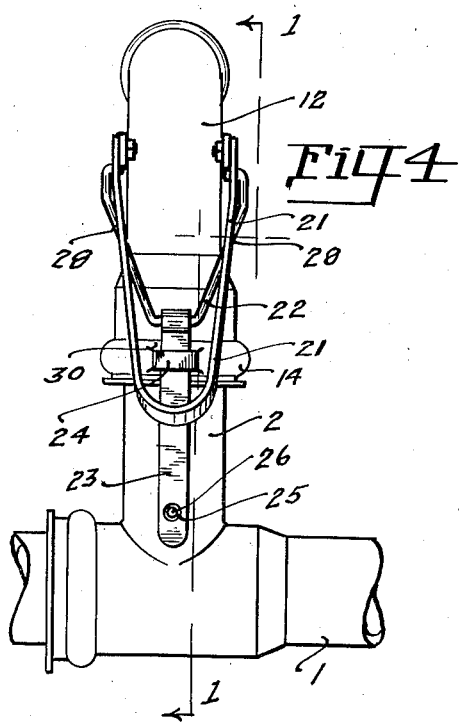
Figure 4 is the veritcal elevation looking from the left toward Figure 2.
Figure 5:
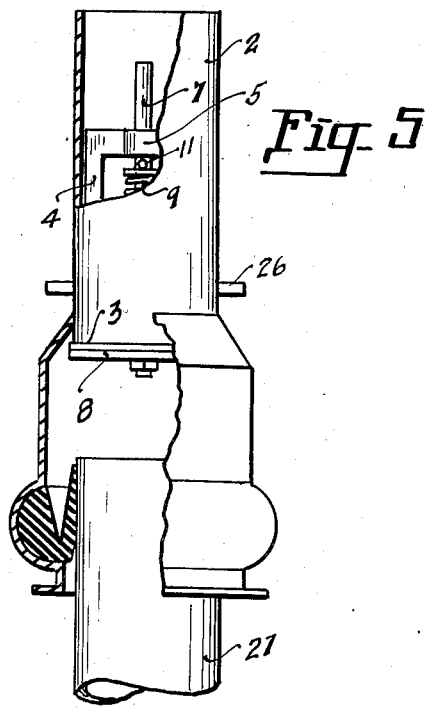
Figure 5 is a vertical view with portions broken away of a modification of the invention.

Referring now to the drawings, the numeral 1 indicates a section of pipe to which another section of pipe 2 connects so forming a T. Section 2 extends into section 1 somewhat and at its base, Figure 1, is provided with a flange 3 constituting a valve seat. Inserted within pipe 2 is a spider 4 having upper and lower stem guides 5 and 6 respectively. Slidable within guides 5 and 6 is a valve stem 7 having a valve 8 adapted to seat on seat 3. A spring 9 coiled about the stem and bearing respectively on guide 6 and washer 10, seats valve 8 on seat 3, it being understood that movement of the washer is prevented by cotter-key 11 extending through stem 7.

In further description of the invention, pipe section 2 may be referred to as the male connection. In conjunction therewith is employed a female connection 12. The lower portion of connection 12 is enlarged at 13 in order that it may fit over the connection 2. Connection 12 is further enlarged at 14 to provide a gasket seat for gasket 15 which provides a substantially liquid tight connection between the two connections.

Numeral 16 indicates a spider mounted within connection 12. This consists of the legs 16' and the partially split sleeve 17. The upper ends of the legs have projecting ears 16" which seat in recesses 18 in the wall of connection 12. It being understood in this connecton that the split construction just described allows the spider 16 to compress somewhat in order that the ears 16" may enter freely into connection 12. When the spider is moved to a position wherein the ears are over the recesses 18 it expands somewhat and the ears enter such recesses. Seated within sleeve is a valve operating bar 19. The lower end of this bar is threaded into the lower end of the sleeve, such threading providing for vertical adjustment of such bar. When the bar 19 is threaded into the sleeve 17, it expands the split upper end of the sleeve forcing and holding the ears 16" into the recesses 18. Threaded to the base of the bar is a contact cap 20, which is to engage the upper end of stem 7.

Pivotally mounted to the exterior of connection 12 is a lever 21. Pivoted to lever 21 is a link 22 by one end, and the other end thereof is pivotally connected to the catch bar 23. Catch bar 23 is slidable back and forth through guide 24. The lower end of catch bar 23 is provided with an opening 25 to slip over catch 26 projecting from connection 2.

In operation, it may be assumed that the connections 2 and 12 are disconnected, and that pipe 1 is being employed to convey water, as for instance, for irrigation purposes. Such being the case, valve 8 is seated upon seat 3 by action of spring 9, thereby closing a connection from pipe 1 to connection 12 and thus preventing escape of water through connection 2. Now connections 2 and 12 are to be connected. This is done by slipping connection 12 over connection 2, during this operation lever 21 is in open position as shown in Figure 2. When the connections are in this initial position cap 20 and bar 19 are in alignment with stem 7, also when in this position opening 25 of catch bar 23 is slipped over catch 26. Thereafter lever 21 is moved to closed position shown in Figure 1. This moves the catch bare upwardly thus pulling down connection 12 over connection 2. As this movement takes place, cap 20 engages the upper end of stem 7 moving it downwardly thus unseating valve 8, thereby allowing water to flow into the connections 2 and 12. A reversal of the operation just described will allow the valve to seat thereby closing the flow of water. Referring to Figure 2, when the lever 21 has been forced down and the catch bar 23 has forced the connection 12 a sufficient height to allow the valve 8 to close, the forcing downward of the lever 21 will bear against the link 22 at 28 forcing its lower end 29 towards the pipe connections causing the catch bar 23 to pivot at 30, which in turn forces the lower end 31 away from the catch 26. This provides for automatically unhooking the catch bar from the catch 26. The catch 26 may be notched at 32 preventing the catch bar 23 from being disengaged therefrom when the lever 21 is brought to the position shown in Figure 1. In many instances additional pipe lengths are connected to connection 12. In that event the lever provides means for moving them with connection 12 as such connection is being made.

Figure 6:
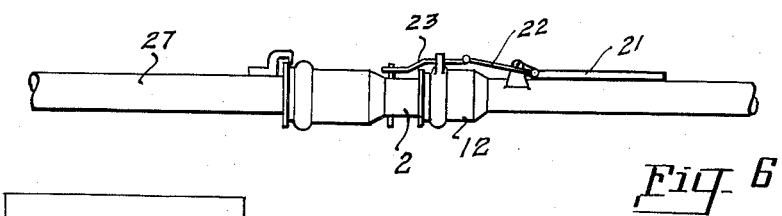
Figure 6 is a horizontal view of the subject matter of Figure 5.

Figure 6 shows the connection being employed in a straight line connection, the T construction being eliminated. In this instance connection 2 is connected in alignment with supply pipe 27.

Figure 7:
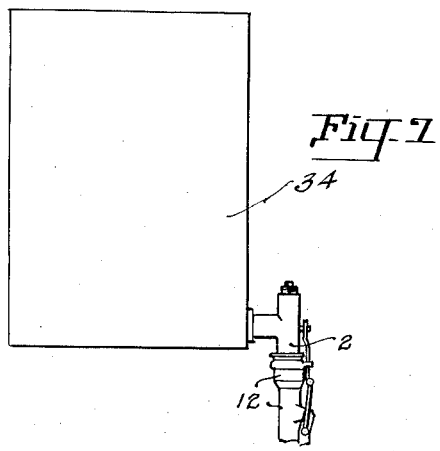
Figure 7 shows the invention being employed in conjunction with a water supply system.

Figure 7 shows the connections being employed in conjunction with the supply tank 34.

I do not wish to be limited to the exact mechanical construction, as other forms of mechanical embodiment may be employed still coming within the scope of the claim to follow.

What I claim is:

A valve and pipe connection comprising male and female connecting members, the male member having an interior flange forming a valve seat, a spider in said male member, a valve stem slidably mounted within the spider, a valve carried by the stem seating on the seat including spring means moving the stem to cause such seating, a spider mounted within the female member, said last spider having a split sleeve and legs provided with ears seating within recesses in the female member when the split portion of the sleeve is expanded, a valve operating bar threaded into the sleeve and expanding its split portion, said bar engaging the valve stem and unseating the valve when the male member is inserted in the female member, and means to draw the male member within the female member comprising a lever pivoted to the female member, a link having one end pivoted to the lever, a catch bar pivotally connected to the other end of the link, and movable back and forth on pivoting the lever, and a catch mounted on the male member engaged by the catch bar.

CHRIS WYSS.